Figure 1:
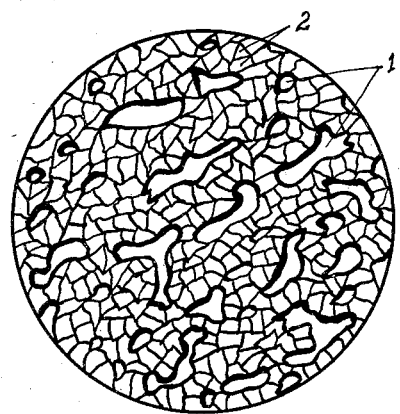

March 12, 1935. R. C. BENNER ET AL 1,993,955

PERMEABLE CERAMIC DIAPHRAGM

Filed Sept. 2, 1933

INVENTORS.
RAYMOND C. BENNER
HENRY N. BAUMANN JR.
BY
ATTORNEY.

Patented Mar. 12, 1935

1,993,955

UNITED STATES PATENT OFFICE 1,993,955

PERMEABLE CERAMIC DIAPHRAGM

Raymond C. Benner and Henry N. Baumann, Jr., Niagara Falls, N. Y., assignors to The Carborundum Company, Niagara Falls, N. Y., a corporation of Pennsylvania Application September 2, 1933, Serial No. 687,978

11 Claims. (Cl. 25—156)

This invention relates to a process for obtaining refractory articles with a high degree of permeability to liquids and/or gases. Our invention relates furthermore to the refractory articles themselves and to the structure of the material constituting the same. More particularly our invention has to do with permeable refractory articles made from a mix whose permanent ingredients consist principally of MgO, $Al_2O_3$ and $SiO_2$, the finished refractory article having been rendered porous or permeable to liquids and/or gases by sintering. We have discovered that porous articles of high permeability may be produced from such a mix when the proportions of the MgO, $Al_2O_3$ and $SiO_2$ are maintained as taught herein.

Ordinary clay mixes when fired have a relatively low permeability. Refractory articles made from such ordinary clay mixes, when examined under the microscope, appear to have a glassy structure. Apparently, the bonding is brought about by one or more fluxes which cause fusion of sufficient material to the glassy state to bring about bonding of the remainder of the material. Such a glassy structure, as is customarily present in refractory articles made from the usual clay mixes, is tough and very durable so long as the refractory articles are not subjected to changes in temperature such as occur in the operation of many types of apparatus. When refractory articles having this glassy structure are subjected to wide ranges of temperature, and more particularly when the change is of such a rigorous nature that one portion of the article will still be at a high temperature while another portion is cooled down to a temperature considerably lower, deterioration is apt to occur if not complete destruction.

We have discovered that mixes very high in clay (as for example from 50 to 85% by weight) to which magnesia is added in the proportion 12 to 18 parts by weight, and preferably about 13 parts by weight, can be formed into a body and sintered without fusion into a refractory article of relatively high permeability. We have discovered that a refractory article can thus be obtained whose permeability is greater than that of ordinary clay mixes when shaped and fired in the customary manner.

We have discovered that the permanent constituents of the mixes should consist principally of magnesia, alumina and silica, the proportion of magnesia (as above described) being maintained between 12 and 18 parts, the proportion of alumina being maintained between 32 and 38 parts and the proportion of silica being maintained between 49 and 55 parts, all of these proportions being by weight. More particularly we have discovered that a body may be obtained which when sintered is 95% or more crystalline if the proportions by weight of magnesia, alumina and silica be approximately 13, 35 and 52 respectively.

Such permeability as we are able to obtain by our invention is of particular advantage in flame arresters, ceramic oil wicks, diffusers for introducing a gaseous medium into a liquid such as the liquor in the aeration tank of a sewage treatment plant, filters—more especially those which in use are subjected to sudden changes in temperature, and blow pit bottoms for filtering out the fibers from the sulphite liquor in paper pulp digesters.

In producing such refractory articles, a mix such as above set forth may be shaped in any suitable fashion. For instance if the article to be formed is bulky, the mix in a comparatively dry state may be pressed or tamped into a mold. For articles which are not bulky, and more particularly, articles having thin walls, we prefer to employ the well known slip-casting procedure. In other words, a slip is provided of a thin soupy consistency, having a water content of about 45% by weight. The permanent ingredients of this slip may consist of clay and magnesia, or again they may consist of powdered flint, alumina and magnesia; but in any event these permanent ingredients should in the ultimate analysis be composed principally of magnesia, alumina and silica in the proportions above specified. The slip may be cast in absorbent molds, for instance plaster of Paris; and after the surplus of slip has been decanted, drying may be carried as nearly to completion as desired, and the articles burned at a temperature between 1300° and 1400° C. When slip casting is the procedure followed, a permeability results which can not be obtained with the ordinary slip casting mix of high clay content, our improvement bringing about an increase in the porosity of the refractory articles to as much as 70%. Moreover in following our improved procedure, all the usual slip-casting advantages of a high clay mix, such as uniformity of consistency of the mix and ease of casting, are retained.

In obtaining porous refractory articles, whether shaping is carried out by the molding or tamping procedure, or whether by the slip-casting procedure, the molded body or casting should be sintered at a temperature between about 1300° and 1400° C., and preferably at about 1375° C. Care should be taken to avoid a temperature in the neighborhood of 1425° C., as a mix containing such a proportion of magnesia melts quite sharply at about 1425° C., and any close approach to this temperature is hazardous. It is interesting that sintering into a homogeneous crystalline phase can be effected at a temperature below the fusion temperature of any of the ingredients of the mix, i. e. magnesia, alumina and silica.

We have discovered in the course of our experiments, that the porosity and permeability of the finished article can be increased if we follow the slip-casting procedure, adding to the permanent ingredients of the slip powdered carbon in the form, for example, of battery coke. The article should be burned or sintered in an oxidizing atmosphere. By following such a procedure, bodies having approximately 70% porosity can be produced. Moreover, if the proportions of magnesia, alumina and silica be approximately 13, 35 and 52 respectively, a body is obtained which is at least 95% crystalline.

For example, a mixture may be made of 12.9% magnesia, 25.5% silica, 48% Georgia kaolin and 13.6% levigated alumina. Approximately half of this mixture should be grog powdered to pass through number 14 mesh. By grog we mean raw material in the proportions above set forth which has been previously heated to about 1200° C. to eliminate shrinkage. Half of the material may be raw material, as has been above described, and this together with the grog may be thoroughly mixed. If this mix is to be made up into refractory articles according to the pressing or tamping procedure, the mix is molded into the desired shapes and burned at about 1375° C., the heat being maintained for about 6 hours.

If this mix is to be made up into articles by the slip casting procedure, an addition is made to the mix of about 5% ball clay. In making the slip, a deflocculent of the following formula may be used in the proportions of 1 kilogram of mix to 50 cubic centimeters of solution:

Sodium silicate U grade _____ 100 grams
Sodium carbonate _____ 30 grams
Distilled water _____ 1000 Ml.

If a slip consisting of ingredients as above set forth be sintered in the manner described, the refractory articles obtained will have a porosity of approximately 40%. By adding to the mix 20% of battery coke, a porosity of 55% may be obtained. In the same way by adding 30% battery coke and 40% battery coke respectively, porosities of 60% and 70% can be obtained.

Examination under the microscope of the bodies of permeable refractory articles obtained in accordance with our invention indicates that there is very little glass present. We have found that if proportions of approximately 13, 35 and 52 be respectively maintained in the instances of magnesia, alumina and silica, 95% or more of the body of the refractory article produced will be of a distinctly crystalline character. Whether this crystalline character is responsible for the beneficial properties of the permeable refractory articles produced in accordance with our invention, we are not able to say. This seems probable; and the most plausible theory for this, of which we are at present aware is that there is an internal inter-locking due to this crystalline structure so as to give the body exceptional strength and stability.

Fig. 1 illustrates the microscopic structure of a petrographic thin section of material made in accordance with our invention.

In this figure, which shows the structure of the material as revealed when a piece of it is ground down to transparent thickness and viewed by polarized light under a petrographic microscope, the areas such as those marked 1 (characterized in the drawing by shaded boundaries) are pores, which are in general interconnected beyond the plane of the section. The remainder of the material is a substantially homogeneous mass of crystals 2 of microscopic dimensions and irregular shapes, firmly bonded to one another. To bring out this structure under a microscope it is advantageous to pass the light through an optical filter, one of the first order red being suitable. A similar section of ordinary slip cast materials is radically different, disclosing particles of the original ingredients weakly united at their interfaces only and either retaining their individual characteristics or containing a large proportion of glass, entirely absent in the section illustrated.

We know that permeability in the finished refractory article can be controlled by the firing temperature, the higher the firing temperature, the greater the permeability obtained. To some extent, permeability may also be controlled by the duration of the heating at maximum temperature, greater permeability being obtained by longer heating. We have reason to believe that the control of the firing temperature and/or the control of the length of time firing at maximum temperature is continued, controls also the size of the crystals in the body of the finished refractory article. We have reason to believe that heating to a higher temperature and/or continuing heating at maximum temperature for a longer period cause growth of the crystals in the structure of the body.

One important advantage of porous articles obtained in accordance with our invention is that the bodies are very resistant to sudden temperature changes. The coefficient of expansion of the crystalline mass constituting the body of such refractory articles is exceptionally low. Accordingly such refractory articles may be used for purposes where sudden changes in temperature tend to cause serious damage to the refractory articles constituting portions of the apparatus. More particularly, this is true in the case of filters which are subjected to rigorous temperature changes with changes in the liquids being filtered. For instance, in certain processes for manufacturing paper pulp, the digester mix is expelled from the digester against a target at high temperatures, and the sulphite liquor allowed to drain off through a porous bottom in the blow pit. These blow pit bottoms are accordingly subjected to sudden changes in temperature which are destructive of the ceramic plates which have been heretofore used in these blow pit bottoms. Articles produced in accordance with our invention have the advantage that they are resistant to an unusual degree to the effects of these sudden changes in temperature, and blow pit bottoms so made are strong and resistant to fracture due to sudden changes in temperature. In fact, permeable refractory articles made in accordance with our invention may be used with advantage, where the requirements are for high permeability and high resistance to shrinkage, even under load, coupled with the ability to withstand frequent changes of an abrupt character in the temperature; inasmuch as bodies of our improved refractory articles have high permeability and apparently consist principally of interlocking crystals.

Our invention has considerable importance as applied to diffusers, such as the plates used for introducing gaseous medium into liquids. In accordance with our invention diffuser plates and other like articles can be produced having high permeability without requiring that the surface skin of the manufactured article be removed by a light abrading of the surface before placing the article in service. This step of removing the surface skin is necessary with ordinary slip cast materials so as to give these articles the full permeability of which they are capable.

In the foregoing description and in the claims we have used the term "permanent ingredient" in connection with slip-casting procedure etc. not to indicate a characteristic of such ingredient while in the slip but to describe such ingredient as being intended to enter permanently into the composition of the fired or sintered body, in contrast with temporary ingredients such as the coke which are not intended to enter permanently into such composition.

While we have above fully described certain preferred embodiments of our invention, it will be understood that our invention is not limited to these embodiments but may be otherwise embodied and practiced within the scope of the following claims:

We claim:—

1. A process for producing a permeable ceramic article which comprises providing a slip whose permanent ingredients consist principally of magnesia, alumina and silica in approximately the proportions by weight of 13, 35 and 52 respectively, casting the slip in the desired shape, drying the casting and firing at a temperature between 1300° C. and 1400° C. to convert the casting into a body which is crystalline.

2. A process for producing a permeable ceramic article which comprises mixing 12 to 18 parts of magnesia, 32 to 38 parts of alumina and 49 to 55 parts of silica by weight to provide a slip, casting the slip in the form of an article, drying the casting and firing at a temperature between 1300° C. and 1400° C. to convert the casting into a body which is crystalline.

3. A process for producing a permeable ceramic article which comprises mixing a slip containing clay, and approximately 12% magnesia by weight, casting the slip, drying the casting, and firing at a temperature between 1300° C. and 1400° C. to convert the casting into a body which is crystalline.

4. A process for producing a permeable ceramic article which comprises providing a slip whose permanent ingredients consist principally of magnesia, alumina and silica in approximately the proportions by weight of 12 to 18, 32 to 38 and 49 to 55 respectively, adding from 20 to 40% battery coke, casting the slip in the desired shape, drying the casting and firing at a temperature between 1300° C. and 1400° C. to convert the casting into a body which is crystalline.

5. A process for producing a permeable ceramic article which comprises providing a slip whose permanent ingredients consist principally of magnesia, alumina and silica in approximately the proportions by weight of 13, 35 and 52 respectively, adding from 20 to 40% of battery coke, casting the slip in the desired shape, drying the casting, and firing at a temperature between 1300° C. to 1400° C. to convert the casting into a body which is crystalline.

6. A permeable ceramic article slip-cast from a mix whose permanent ingredients consist principally of 12 to 18 parts of magnesia, 32 to 38 parts of alumina and 49 to 55 parts of silica by weight and fired at a temperature between 1300° C. and 1400° C. to convert the casting into a body which is crystalline.

7. A permeable ceramic article slip-cast from a mix whose permanent ingredients consist principally of about 13 parts magnesia, 35 parts alumina and 52 parts silica by weight and fired at a temperature between 1300° C. and 1400° C. to convert the casting into a body which is crystalline.

8. A permeable ceramic article slip-cast from a mix whose permanent ingredients consist principally of clay and approximately 12% magnesia by weight, and fired at a temperature between 1300° C. and 1400° C.

9. A permeable ceramic article slip cast from a mix whose permanent ingredients consist principally of magnesia, alumina and silica and rendered at least 95% crystalline by firing at a temperature between 1300° C. and 1400° C.

10. A permeable ceramic article having a substantially completely crystalline structure and composed of 12 to 18 parts magnesia, 32 to 38 parts alumina, and 49 to 55 parts silica by weight.

11. A permeable ceramic article consisting of 12 to 18 percent magnesia, 32 to 38 percent alumina and 49 to 55 percent silica by weight, and fired to convert it into a homogeneous crystalline body.

RAYMOND C. BENNER.
HENRY N. BAUMANN, Jr.